(12) United States Patent
Barth

(10) Patent No.: US 9,491,284 B2
(45) Date of Patent: Nov. 8, 2016

(54) CALL TERMINATION ON OTT NETWORK

(71) Applicant: Viber Media SARL, Luxembourg (LU)

(72) Inventor: Matan Barth, Modiin (IL)

(73) Assignee: Viber Media Sarl, Luxembourg (LU)

( * ) Notice: Subject to any disclaimer, the term of this patent is extended or adjusted under 35 U.S.C. 154(b) by 0 days.

(21) Appl. No.: 14/650,002

(22) PCT Filed: Oct. 19, 2013

(86) PCT No.: PCT/IB2013/059469
§ 371 (c)(1),
(2) Date: Jun. 5, 2015

(87) PCT Pub. No.: WO2014/087269
PCT Pub. Date: Jun. 12, 2014

(65) Prior Publication Data
US 2016/0127538 A1 May 5, 2016

Related U.S. Application Data

(60) Provisional application No. 61/733,436, filed on Dec. 5, 2012.

(51) Int. Cl.
| | |
|---|---|
| *H04M 7/00* | (2006.01) |
| *H04M 3/32* | (2006.01) |
| *H04M 7/12* | (2006.01) |
| *H04M 3/46* | (2006.01) |

(52) U.S. Cl.
CPC ........... *H04M 3/323* (2013.01); *H04M 7/0057* (2013.01); *H04M 7/1285* (2013.01); *H04M 3/465* (2013.01)

(58) Field of Classification Search
CPC .................. H04L 29/06027; H04L 29/12028; H04M 3/42263; H04M 1/651; H04M 1/72563; H04M 2250/60; H04M 3/42042; H04M 7/006; H04M 3/56
USPC ................ 379/219, 221.01, 221.02; 370/352
See application file for complete search history.

(56) References Cited

U.S. PATENT DOCUMENTS

| | | | |
|---|---|---|---|
| 6,865,266 B1 | 3/2005 | Pershan | |
| 8,180,045 B2* | 5/2012 | Coppage | H04M 7/0057 370/252 |
| 2003/0002485 A1* | 1/2003 | Emerson, III | H04L 29/06027 370/352 |
| 2003/0131132 A1 | 7/2003 | Cheng et al. | |
| 2006/0072726 A1* | 4/2006 | Klein | H04M 3/42153 379/201.01 |
| 2007/0002830 A1 | 1/2007 | Beckemeyer | |

(Continued)

FOREIGN PATENT DOCUMENTS

| | | |
|---|---|---|
| WO | 2006129296 A1 | 12/2006 |
| WO | 2007025311 | 3/2007 |

*Primary Examiner* — Quoc D Tran
(74) *Attorney, Agent, or Firm* — Gable Gotwals

(57) ABSTRACT

This invention relates to a method of seamlessly connecting over-the-top and traditional telecommunication network networks including receiving by a telecommunications service provider from a calling party a dialed number of a called party; communicating by the telecommunication service provider the dialed number to an over-the-top servicer provider; checking by the over-the-top service provider whether it can terminate the call; and communicating the checking results to the telecommunication service provider, wherein the telecommunication service provider is capable of rerouting the call in case of failure in a manner that is seamless to both the calling party and the called party.

15 Claims, 7 Drawing Sheets

(56) References Cited

U.S. PATENT DOCUMENTS

| | | |
|---|---|---|
| 2008/0267384 A1 | 10/2008 | George |
| 2009/0022149 A1 | 1/2009 | Rosenberg et al. |
| 2009/0168757 A1* | 7/2009 | Bush .................. H04M 7/0057 370/352 |
| 2010/0098057 A1 | 4/2010 | Stewart |

* cited by examiner

CALL TERMINATION ON OTT NETWORK

FIELD OF THE INVENTION

The present invention is in the field of call terminations and more specifically termination of calls originating from OTT or non-OTT terminals and terminating seamlessly at OTT or non-OTT terminals.

CROSS-REFERENCE TO RELATED PATENT APPLICATIONS

This application is the United States National Phase of Patent Application No. PCT/IB2013/059469 filed 19 Oct. 2013, which claims priority from and is related to U.S. Provisional Patent Application Ser. No. 61/733,436 filed Dec. 5, 2012, this U.S. Provisional Patent Application incorporated by reference in its entirety herein.

BACKGROUND

Call termination, also known as voice termination, refers to the routing of telephone calls from one telephone company, also known as a carrier or provider, to another.

The terminating point is the called party or end point. The originating point is the calling party who initiates the call.

Traditional Telecommunication Network (TTN) is a network which uses technologies such as: GSM, CDMA, WCDMA, PSTN etc. and does not use a VoIP technology for its last hop voice communication to the end user device.

These networks usually use E.164 numbering format to represent the user identity (e.g. 18092005151)

Traditional Terminal Application (TTA) is a terminal application capable of receiving calls on traditional telecommunications networks (TTN).

OTT is an acronym standing for over-the-top, covering a wide range of content delivered through applications and third-party services which are independent of the underlying communication infrastructure technology. OTT is usually used to describe applications that use the Telecommunications Service Provider (TSP) infrastructure to provide services and applications to its network subscribers competing sometimes with the traditional TSP's services. Over-the-top content can be accessed directly through an Internet-connected platform such as a PC, laptop, tablet, smartphone, and other web enabled devices. Some examples of OTT services are Skype, Google Voice and Viber, which operate and deliver VoIP, messaging and/or video services OTT terminal application (OTA) is an end user application that is connected to the OTT network and is capable of receiving voice calls using a VoIP technology.

Assume a person wishes to place an international call to Japan. The calling party will dial a number comprising an international call prefix, then the destination country calling code (e.g. 81 for Japan), then (usually) an area code, omitting or suppressing leading zero, then the local telephone number.

The calling party's Telecommunications Service Provider (TSP) now looks for a service provider in Japan that can terminate the call to the number dialed, such as NTT (Nippon Telegraph and Telephone Corporation) or some other telecommunication provider such as AT&T, Orange, O2, Vodafone, BT, France Telecom, or any TSP having business relations with the calling party's TSP and capable of routing the call to the end-point.

It does so by routing the call to the carrier (computer to computer) it has business relations with; the carrier will check whether it can make the call to the specified number. If it can, the call will be routed to the user or to a third party carrier. If it cannot route the call it will reject the call and the calling party's TSP will try the next hop (i.e. a different carrier). This process is done sequentially carrier by carrier.

FIG. 1 is a schematic representation of a prior-art system 100 for a call from one TTA terminal 105 to another TTA terminal 140. The caller's local TSP (TSP1 110) receives the caller's dialed standard TTN number and begins a sequential search of another TTN carrier (e.g. TSP2 120) to terminate the call. If TSP2 rejects the call, TSP1 continues the sequential search until it reaches Non OTT TSPi 130 which is able to terminate the call to the OTA 140.

FIG. 2 is a schematic representation of another prior art system 200 for a call from a TTA terminal 205 to an OTA 230. The caller's local TSP (TSP1 210) receives the caller's dialed OTT number and begins a sequential search of another TTN carrier (e.g. TSP2 220) to terminate the call. If TSP2 rejects the call, TSP1 continues the sequential search until it reaches the end of its available TSPs list. The call cannot be terminated. The reason is that the OTT carrier and the TSP do not share the same user identity (numbering format).

FIG. 3 is a schematic representation of another prior art system 300 for a call from a TTA terminal 305 to an OTA 340. In this configuration the OTA 340 has been allocated a special number for TTN to OTT communication, different than its regular identity. The caller's local TSP (TSP1 310) receives the caller's dialed OTT number and communicates it to an OTT gateway 320. OTT gateway 320 recognizes the dialed number as belonging to OTT TSP 330 and OTT TSP 330 can match the dialed number with an OTT (e.g. Skype) user 340

In order to provide smooth TTA to OTA communication there is need for a call originating from a TTA to terminate seamlessly at an OTA.

SUMMARY

According to an aspect of the present invention there is provided a method of seamlessly connecting OTT and TTN i.e. non-OTT networks, comprising: receiving by a TSP from a calling party a dialed number of a called party; communicating by said TSP the dialed number to an OTT service provider; checking by said OTT service provider whether it can terminate said call; and communicating said checking results to the TSP, wherein said TSP is capable of rerouting said call in case of failure in a manner that is seamless to both the calling party and the called party.

The method may further comprise: selecting by said TSP the OTT service provider as call terminator for said telephone call; and terminating said call by said OTT service provider.

Checking may comprise checking whether the dialed number is associated with a registered member of said OTT service.

Checking may comprise checking whether the called party is online.

Checking may comprise checking whether the connectivity between the OTT service provider and the called party is adequate.

Checking whether the communication is adequate may comprise performing a communication test.

Checking whether the communication is adequate may comprise referring to a database of aggregated historical data.

Checking whether the communication is adequate may comprise checking whether said communication is Wi-Fi.

Checking may comprise checking which communications network is currently used by the called user.

Checking by said OTT service provider may comprise checking if the OTT end user wishes to receive calls from a TTN on its OTA.

According to another aspect of the present invention there is provided a method of seamlessly connecting OTT and non-OTT networks, comprising: receiving by a TSP from a calling party a dialed number of a called party; communicating by said TSP the dialed number in parallel to an OTT service provider and to a TTN service provider; checking by said OTT service provider whether it can terminate said telephone call; communicating said checking results to the TSP; checking by said TTN service provider whether it can terminate said telephone call; communicating said checking results to the TSP; and terminating said call by one of said OTT and TTN service providers.

Checking by said OTT service provider may comprise checking whether the dialed number is associated with a registered member of said OTT service.

Checking by said OTT service provider may comprise checking whether the called party is online.

Checking by said OTT service provider may comprise checking whether the connectivity between the OTT service provider and the called party is adequate.

Checking whether the communication is adequate may comprise performing a communication test.

Checking whether the communication is adequate may comprise referring to a database of aggregated historical data.

Checking whether the communication is adequate may comprise checking whether said communication is Wi-Fi.

Checking by said OTT service provider may comprise checking which communications network is currently used by the called user.

Checking by said OTT service provider may comprise checking if the OTT end user wishes to receive calls from a TTN on its OTA.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

The present invention enables OTT service providers to serve as last hop call terminators on an OTT network, for calls not necessarily initiated as OTT calls. It merges the non-OTT (TTN) and OTT communication, improves calling efficiency, improves call completion probability, increases the number of destination devices that can be reached and allows parallel calling feature.

OTT service users may decide whether they wish to allow routing of non-OTT originating calls to their OTT application. This allows the OTT user to decide on which network he would like to receive his calls thus making the user an active element in networks routing decisions.

The way to do it is by allowing the user to select on his OTA user interface to accept or not to accept on his OTA inbound regular calls not originated by other OTT clients. According to the user's selection, the OTA signals the OTT network the user's choice and the OTT network routes the calls accordingly.

When the OTT network receives an inbound call request from a TTN it has to check the user preferences before it decide to route the call into the network or reject it.

Figure 1:
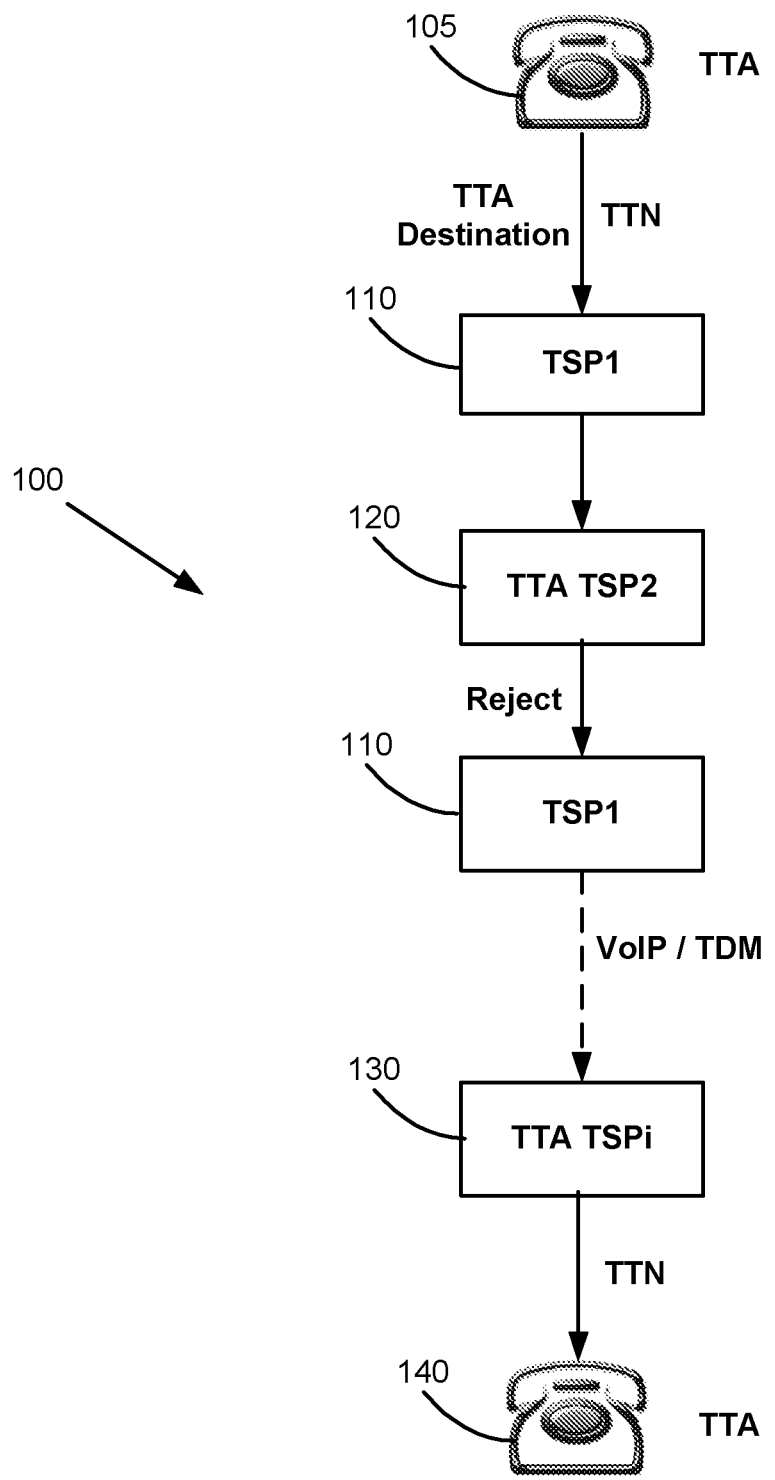
FIG. 1 is a schematic representation of a prior-art system for a call from one TTA to another TTA.
Figure 2:
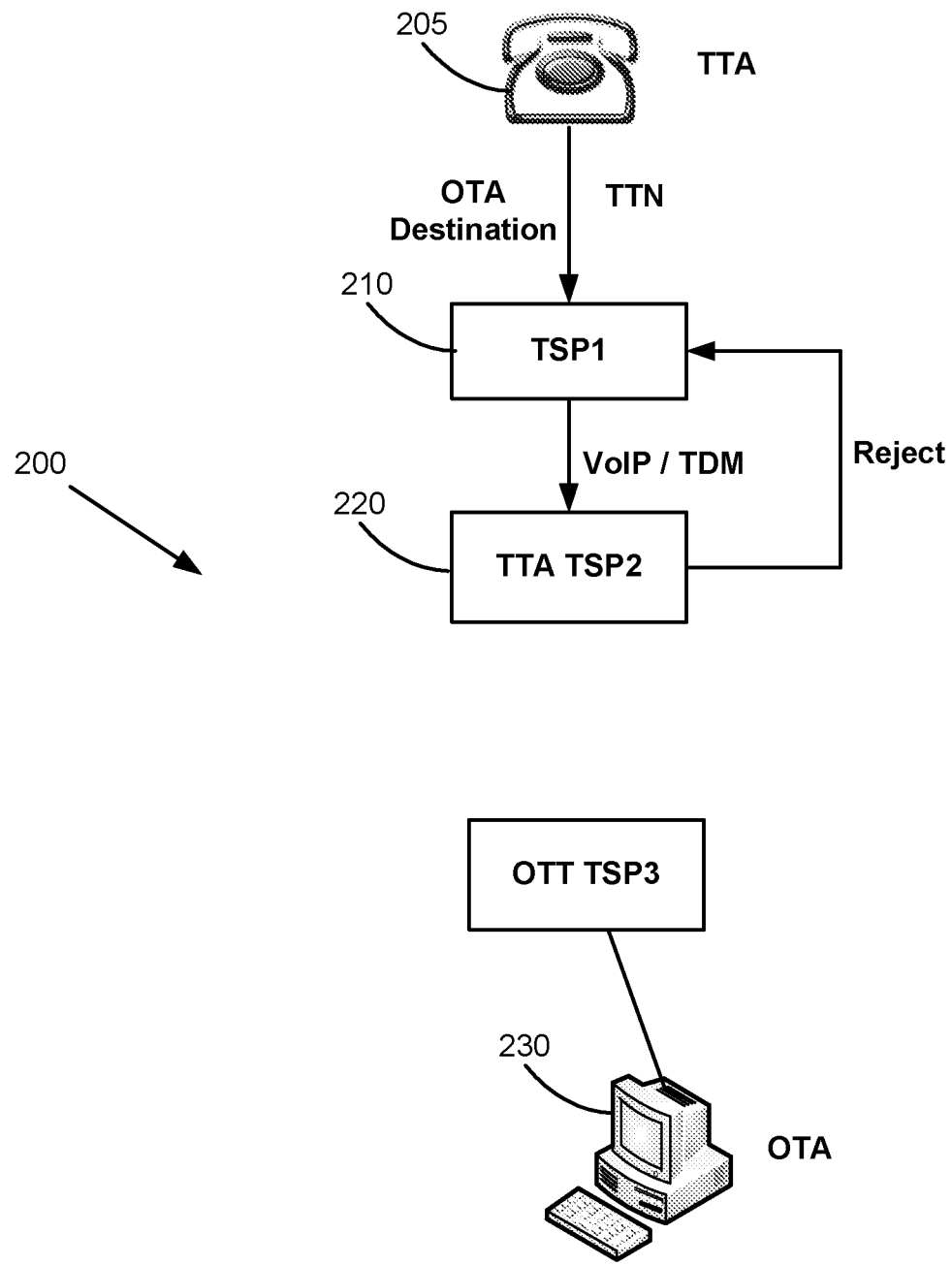
FIG. 2 is a schematic representation of a prior art system for a call from a TTA to an OTA.
Figure 3:
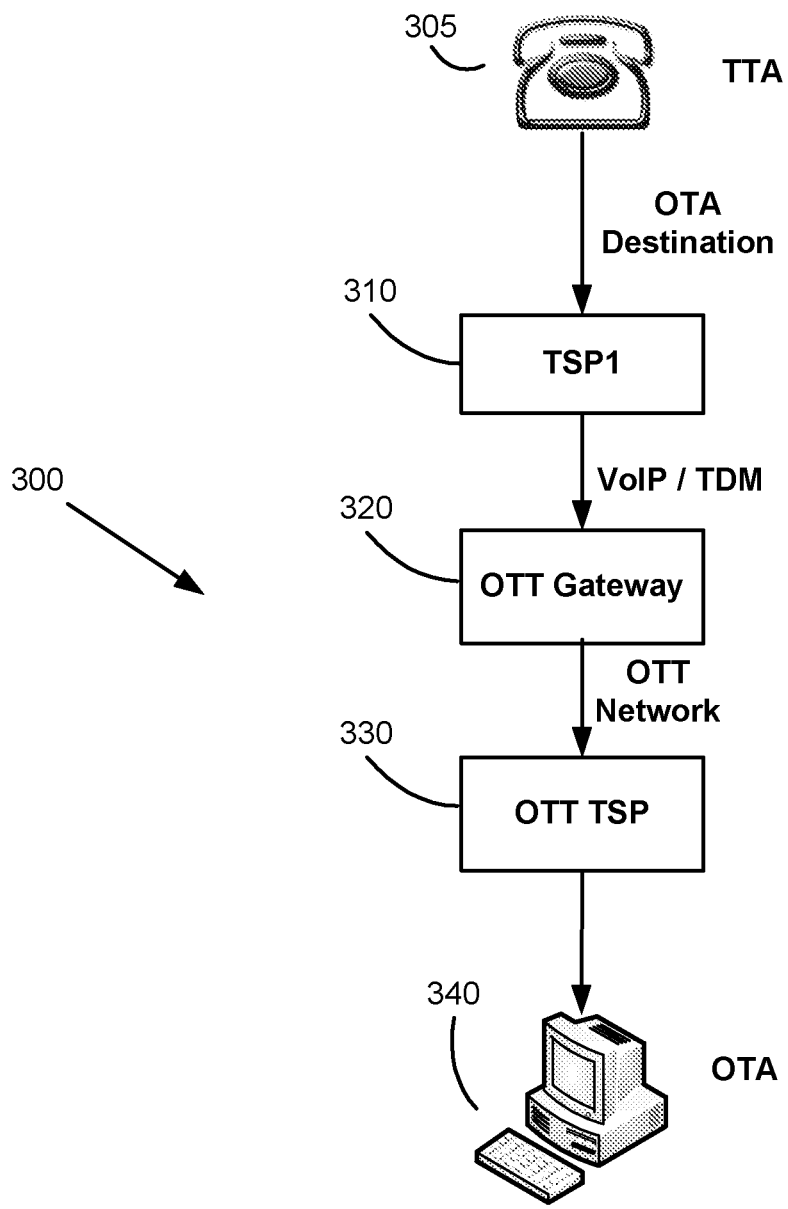
FIG. 3 is a schematic representation of another prior art system for a call from a TTA to an OTA.
Figure 4A:
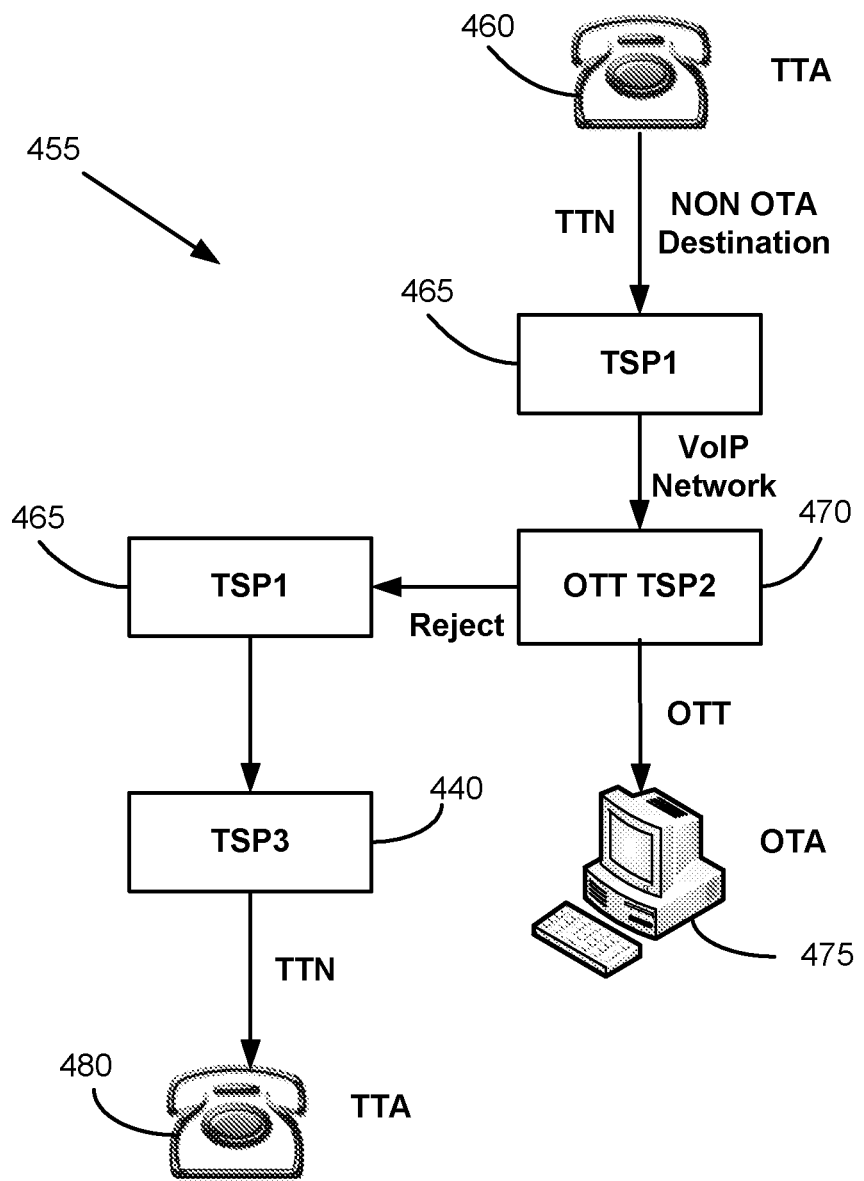
FIGS. 4A and 4B are schematic representation of a call termination system according to the present invention, comprising a TTA caller dialing a TTA phone number.

FIG. 4A is a schematic representation of a call termination system 455 according to the present invention, comprising a TTA caller terminal 460 dialing a standard TTN phone number. The caller's local TTN TSP1 465 which receives the caller's dialed number may first communicate the call termination request to an OTT TSP2 470. TSP 470 may check whether the called number belongs to a user of its OTT service and determine if OTT network can connect the call. Otherwise, if OTT TSP2 470 rejects the call, TTN TSP1 465 may continue a sequential search for another TSP (OTT or TTN) until it finds e.g. TTN TSP3 440 that is able to terminate the call.

Figure 4B:
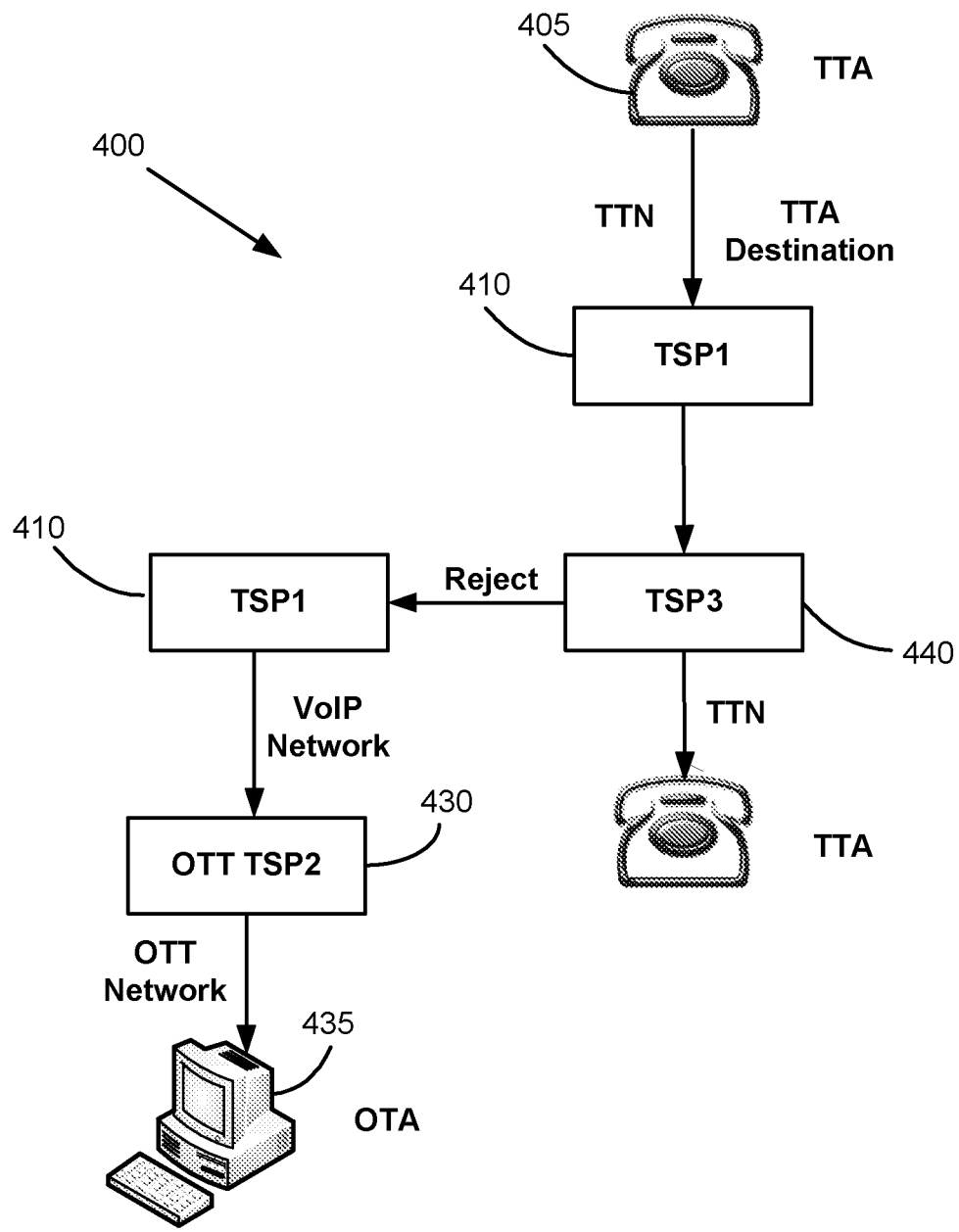

FIG. 4B is a schematic representation of a similar call termination system 400 according to the present invention, comprising a TTA caller terminal 405 dialing a standard TTN phone number. The caller's local TTN TSP1 410 which receives the caller's dialed number may first communicate the call termination request to a TTN TSP3 440. TSP3 440 may check whether it can terminate the call. Otherwise, if TSP3 440 rejects the call, TSP1 410 will continue a sequential search for another TSP (OTT or TTN) until it finds e.g. OTT TSP2 430 that is able to terminate the call.

Figure 5:
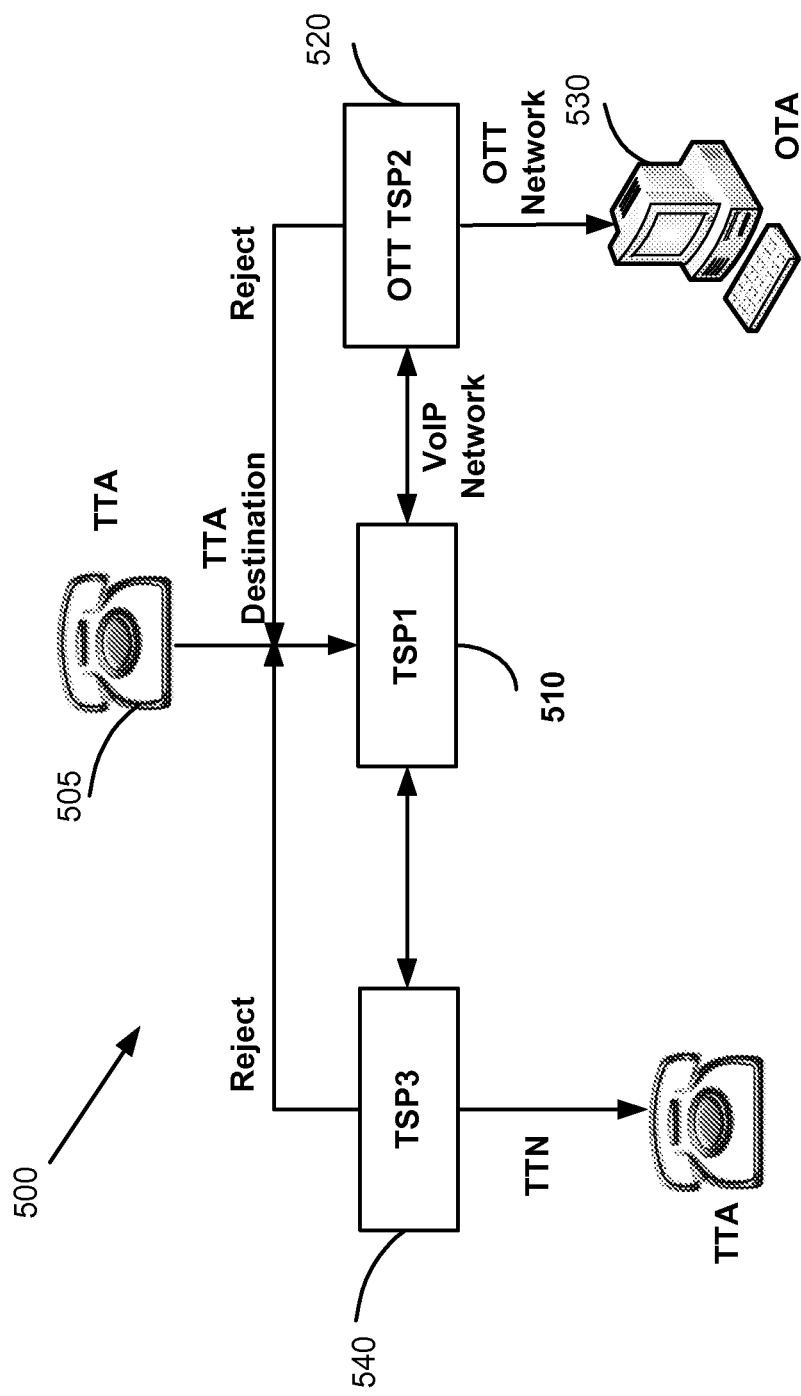
FIG. 5 is a schematic representation of another call termination system according to the present invention, comprising a TTA caller dialing a TTA phone number.

FIG. 5 is a schematic representation of another call termination system 500 according to the present invention, comprising a TTA caller terminal 505 dialing a standard TTN phone number. The caller's local TTN TSP1 510 which receives the caller's dialed number may communicate the call termination request in parallel to an OTT TSP2 520 and a TTN TSP3 540. TSP2 520 may check whether the called number belongs to a user of its OTT service and determine that it can terminate the call if the user is currently online and according to the user preferences. At the same time, TSP3 540 may check whether it can terminate the call.

Two scenarios may happen then:
1. TTN TSP and/or OTT TSP will reject the call because they cannot terminate the call to this destination, and the call attempt may continue at the other TTN TSP/OTT TSP or will be rejected.
2. Both devices connected to the TSP network and to the OTT network will ring in parallel:
   a. If the user answers one of the phones the other ringing will be cancelled.
   b. If user does not answer any of the phones the call will be cancelled after a timeout.

Figure 6:
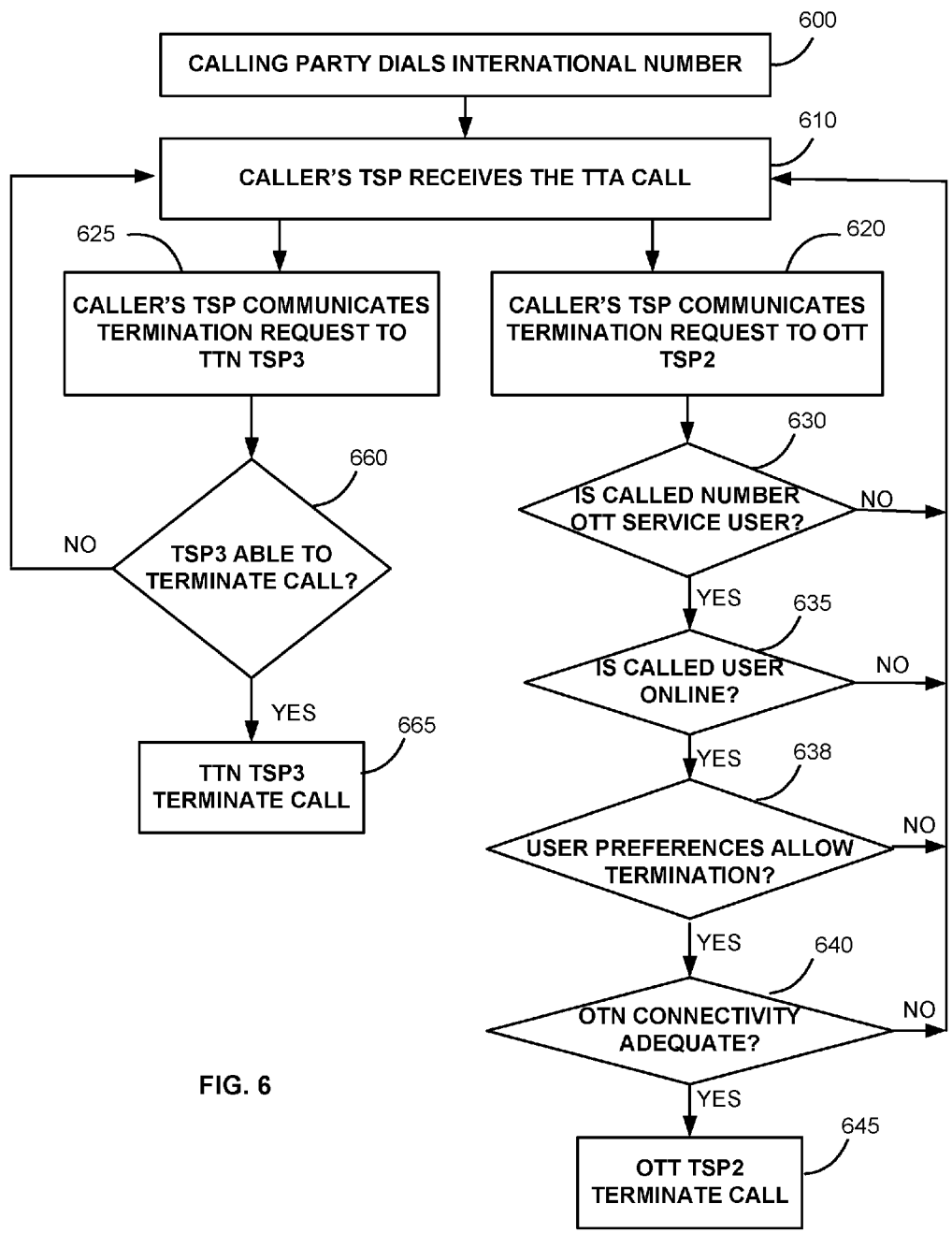
FIG. 6 is a flowchart showing the process according to the present invention as represented by the embodiment of FIG. 5.

FIG. 6 is a flowchart showing the process according to the present invention as represented by the embodiment of FIG. 5.

In step 600 the caller dials an e.g. international number which is a standard TTN number.

In step 610 the caller's local TSP receives the dialed number and looks for a provider to terminate the call among a list of termination providers with which it is connected. The list may comprise OTT and TTN providers. The local TSP communicates in parallel with the potential termination providers to select one for terminating the current call.

In step 620 an OTT service provider TSP2 approached by the local TSP provider starts checking whether it can provide the service reliably and quickly by checking in its server database whether the called party is a registered user of the OTT server (step 630). If not, the OTT provider declines the offer to serve as call terminator for the current call.

If in step 630 the OTT service provider determines that the called party is a registered user of its OTT service, it proceeds to check whether the called party is currently online (step 635) and if the user's routing preferences allow for routing TTN initiated calls to its OTA. If not, the OTT service provider declines the offer to serve as call terminator for the current call.

In step 638, if the OTT service provider determines that the called party is currently online and that the user's routing preferences allow for routing TTN initiated calls to its OTA, it may check whether the connectivity is adequate (step 640), e.g. by a short performance test: sending a small number (e.g. 10) of packets as fast as it can, waiting for recipient terminal to reply, testing the arrival times of the replies and trying to estimate connectivity and/or by checking the last time the device was called or interacted with (e.g. chat) and using the quality parameters measured on this last interaction. Quality parameters may be: packet delay rates, packet loss rates, jitter buffer rates, user quality opinion (given after interaction was ended). Alternatively or additionally, OTT service providers may determine a current connectivity quality by referring to a database of aggregated historical data. If the connectivity is determined to be inadequate, the OTT provider may decline the offer to serve as call terminator for the current call. Alternatively or additionally, the OTT service provider may determine that the current connectivity is adequate by checking the type of network used (e.g. Wi-Fi or 3G).

If the connectivity is determined to be adequate, the OTT TSP2 terminates the call (step 645).

In step 625, the caller's TSP communicates in parallel the call termination request to a TTN TSP3. In step 660 TSP3 checks whether it is able to terminate the call. If not, TSP3 declines the offer to serve as call terminator for the current call. Otherwise, TSP3 terminates the call (step 665).

It is noted that whenever the caller's TSP finds the first TSP to successfully terminate the call, it may communicate a "cancel" message to the other TSPs approached in parallel.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

At least some of the subject matter described herein may be implemented in digital electronic circuitry, in computer software, firmware, hardware, or in combinations of them. The subject matter described herein may be implemented as one or more computer program products, i.e. one or more computer programs tangibly embodied in a non-transitory media, e.g. in a machine-readable storage device, for execution by, or control the operation of a data processing apparatus, e.g. a programmable processor, a computer or multiple computers. A computer program (also known as a program, software, software application or code) can be written in any programming language. A computer program does not necessarily correspond to a file. A computer program can be executed on one computer or on multiple computers at one site or distributed across multiple sites.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description.

The invention claimed is:

1. A method of seamlessly connecting over-the-top (OTT) networks and traditional telecommunication networks, comprising:
   receiving by a traditional telecommunication network telecommunications service provider from a calling party a dialed number of a called party;
   communicating by said traditional telecommunications network telecommunications service provider the dialed number to an over-the-top service provider;
   checking by said over-the-top service provider whether it can terminate said call; said checking comprising checking whether the connectivity between the over-to-top service provider and the called party is adequate according to at least one of: performing a communication test and checking whether said communication is a wireless local area network; and
   communicating said checking results to the telecommunication service provider, wherein said telecommunication service provider is capable of rerouting said call in case of failure in a manner that is seamless to both the calling party and the called party.

2. The method of claim 1, further comprising:
   selecting by said telecommunication service provider the over-the-top service provider as call terminator for said call; and
   terminating said call by said over-the-top service provider.

3. The method of claim 1, wherein said checking comprises checking whether the dialed number is associated with a registered member of said over-the-top service.

4. The method of claim 1, wherein said checking comprises checking whether the called party is online.

5. The method of claim 1, wherein said checking comprises checking which communications network is currently used by the called user.

6. The method of claim 1, wherein said checking comprises checking the called party's routing preferences.

7. A method of seamlessly connecting over-the-top and traditional telecommunication network networks, comprising:
- receiving by a telecommunication service provider from a calling party a dialed number of a called party;
- communicating by said telecommunication service provider the dialed number in parallel to an over-the-top service provider and to a traditional telecommunication network service provider;
- checking by said over-the-top service provider whether it can terminate said call;
- communicating said checking results to the telecommunication service provider;
- checking by said traditional telecommunication network service provider whether it can terminate said call;
- communicating said checking results to the telecommunication service provider; and
- terminating said call by one of said over-the-top and traditional telecommunication network service providers.

8. The method of claim 7, wherein said checking by said over-the-top service provider comprises checking whether the dialed number is associated with a registered member of said over-the-top service.

9. The method of claim 8, wherein said checking by said over-the-top service provider comprises checking whether the called party is online.

10. The method of claim 9, wherein said checking by said over-the-top service provider comprises checking whether the connectivity between the over-the-top service provider and the called party is adequate.

11. The method of claim 10, wherein said checking whether the communication is adequate comprises performing a communication test.

12. The method of claim 10, wherein said checking whether the communication is adequate comprises referring to a database of aggregated historical data.

13. The method of claim 10, wherein said checking whether the communication is adequate comprises checking whether said communication is a wireless local area network.

14. The method of claim 7, wherein said checking by said over-the-top service provider comprises checking which communications network is currently used by the called user.

15. The method of claim 9, wherein said checking comprises checking the called party's routing preferences.

* * * * *